(12) United States Patent
Townley et al.

(10) Patent No.: US 11,584,273 B2
(45) Date of Patent: Feb. 21, 2023

(54) TRIM ASSEMBLY ORNAMENTAL STITCHING

(71) Applicant: Lear Corporation, Southfield, MI (US)

(72) Inventors: Lisa Townley, Allen Park, MI (US); Louella Ann Patterson, Goodells, MI (US); Jeanette Puig Pey, Keego Harbor, MI (US); Angela Scott, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 167 days.

(21) Appl. No.: 16/553,659

(22) Filed: Aug. 28, 2019

(65) Prior Publication Data

US 2021/0061148 A1 Mar. 4, 2021

(51) Int. Cl.
*B60N 2/58* (2006.01)
*B60N 2/90* (2018.01)

(52) U.S. Cl.
CPC ............. *B60N 2/5883* (2013.01); *B60N 2/90* (2018.02)

(58) Field of Classification Search
CPC ........ B60N 2/5883; B60N 2/60; B60N 2/609; B60N 2/90; B68G 11/00; B68G 11/03; B68G 13/00; B68G 13/02; B68G 7/10; B68G 7/105
See application file for complete search history.

(56) References Cited

U.S. PATENT DOCUMENTS

| | | | | |
|---|---|---|---|---|
| 2,051,077 A * | 8/1936 | Dowdall | ............ | A41D 19/0051 112/417 |
| 2,079,569 A * | 5/1937 | Christensen | ........... | D05B 93/00 112/475.01 |
| 2,172,224 A | 9/1939 | Sailer | | |
| 2,427,023 A * | 9/1947 | Schwartz | ............... | A43D 55/00 36/19.5 |
| 2,448,495 A * | 8/1948 | Muecke | ................. | D05B 93/00 112/475.26 |
| 2,471,165 A * | 5/1949 | Nachman | ............... | D05B 93/00 2/244 |
| 2,567,913 A | 9/1951 | Webster | | |
| 2,600,908 A * | 6/1952 | Nachman | ............... | A47H 13/14 112/427 |
| 3,025,527 A * | 3/1962 | Seward | ................... | A41D 11/00 2/70 |
| 3,616,147 A * | 10/1971 | Ambrose | .............. | B29C 48/304 428/365 |

(Continued)

FOREIGN PATENT DOCUMENTS

DE 102010063427 A1 6/2012
EP 2283749 B1 10/2012
(Continued)

*Primary Examiner* — David R Dunn
*Assistant Examiner* — Christopher E Veraa
(74) *Attorney, Agent, or Firm* — Brooks Kushman P.C.

(57) ABSTRACT

A seat assembly is provided with a frame, and a trim assembly oriented about the frame to conceal the frame. The trim assembly is provided with a first trim panel, a second trim panel, and a structurally reinforced seam with piping along an intersection of the first trim panel and the second trim panel. Ornamental stitching is provided along an exterior length of the structurally reinforced seam and incrementally traverses the structurally reinforced seam to interconnect the first trim panel and the second trim panel along the structurally reinforced seam, and to provide an ornamental stitching appearance to the structurally reinforced seam.

13 Claims, 3 Drawing Sheets

(56) References Cited

U.S. PATENT DOCUMENTS

| | | | | |
|---|---|---|---|---|
| 3,665,880 | A * | 5/1972 | Ambrose | D04D 1/00 112/417 |
| 4,307,764 | A * | 12/1981 | Nattrass | B65D 88/1681 383/17 |
| 4,573,420 | A * | 3/1986 | Carson | D05B 35/02 112/142 |
| 5,359,950 | A * | 11/1994 | Schellas | A41D 27/24 112/475.17 |
| 5,893,579 | A * | 4/1999 | Kimura | B60R 21/207 280/730.2 |
| 6,450,678 | B1 * | 9/2002 | Bayersdorfer | B60Q 3/54 362/488 |
| 6,817,307 | B2 | 11/2004 | Gerster | |
| 7,690,318 | B2 * | 4/2010 | Dooley | B60R 13/02 112/475.17 |
| 8,100,070 | B2 | 1/2012 | Boinais et al. | |
| 10,112,514 | B2 | 10/2018 | Lemarchand et al. | |
| 2002/0101110 | A1 * | 8/2002 | Mosquera | B60N 2/58 297/452.58 |
| 2007/0022931 | A1 * | 2/2007 | Wieczorek | D05B 35/06 112/475.06 |
| 2008/0264320 | A1 * | 10/2008 | Harward | B29C 66/0324 112/475.17 |
| 2013/0077338 | A1 * | 3/2013 | Wenzel | G02B 6/0005 362/551 |
| 2014/0042767 | A1 * | 2/2014 | Filipp | B32B 3/263 296/70 |
| 2015/0375654 | A1 * | 12/2015 | Lemarchand | D05B 15/00 297/452.1 |
| 2016/0375807 | A1 * | 12/2016 | Kageyama | B60N 2/58 297/452.61 |
| 2017/0088028 | A1 * | 3/2017 | Nishikido | B60N 2/90 |
| 2017/0114485 | A1 * | 4/2017 | Yoshizawa | D05B 3/00 |
| 2017/0305317 | A1 * | 10/2017 | Sekino | B60N 2/58 |
| 2018/0093596 | A1 * | 4/2018 | Kumagai | B60N 2/0228 |
| 2019/0001877 | A1 * | 1/2019 | Unger | G02B 6/001 |
| 2019/0359099 | A1 * | 11/2019 | Lorenzi | B60N 2/5883 |

FOREIGN PATENT DOCUMENTS

| | | |
|---|---|---|
| EP | 3020606 B1 | 1/2018 |
| FR | 3022504 B1 | 7/2016 |
| FR | 3023566 B1 | 5/2017 |
| JP | H05345084 A | 12/1993 |

* cited by examiner

TRIM ASSEMBLY ORNAMENTAL STITCHING

TECHNICAL FIELD

Various embodiments relate to ornamental stitching for trim assemblies, such as seat trim assemblies.

BACKGROUND

The prior art has provided vehicle seat trim assemblies.

SUMMARY

According to at least one embodiment, a trim assembly is provided with a first trim panel, a second trim panel, and a structurally reinforced seam along an intersection of the first trim panel and the second trim panel. Ornamental stitching is provided along an exterior length of the structurally reinforced seam and incrementally traverses the structurally reinforced seam to interconnect the first trim panel and the second trim panel along the structurally reinforced seam and to provide an ornamental stitching appearance to the structurally reinforced seam.

According to a further embodiment, the structurally reinforced seam is further provided as piping.

According to an even further embodiment, the piping is provided with a longitudinal body, and a flange extending along a length of the longitudinal body. The flange has a thickness less than a cross-section of the longitudinal body. The flange is interconnected to the first trim panel and the second trim panel by the ornamental stitching.

According to an even further embodiment, the ornamental stitching extends through the first trim panel, the second trim panel and the flange.

According to another even further embodiment, the longitudinal body is exposed externally from the trim assembly.

According to an even further embodiment, the ornamental stitching incrementally traverses the longitudinal body to provide the ornamental stitching appearance to the structurally reinforced seam.

According to another further embodiment, the ornamental stitching has a different color than the piping.

According to an even further embodiment, the piping is provided with a longitudinal body.

According to an even further embodiment, a piping core is concealed within the longitudinal body of the piping.

According to an even further embodiment, the ornamental stitching extends through the first trim panel and the second trim panel so that a trim panel portion encloses the longitudinal body externally.

According to another even further embodiment, the ornamental stitching extends through the first trim panel and the second trim panel so that the piping provides an additional thickness to the structurally reinforced seam.

According to an even further embodiment, the ornamental stitching incrementally traverses the longitudinal body to provide the ornamental stitching appearance to the structurally reinforced seam.

According to another further embodiment, the ornamental stitching is provided with a pair of external threads that alternatingly cross the structurally reinforced seam and each other.

According to an even further embodiment, the pair of external threads are arranged diagonally along the length of the structurally reinforced seam.

According to another further embodiment, the ornamental stitching is provided with one external thread that incrementally extends along the length of the structurally reinforced seam and traverses the structurally reinforced seam.

According to an even further embodiment, the ornamental stitching traverses the structurally reinforced seam perpendicular to a lengthwise direction of the structurally reinforced seam.

According to another further embodiment, inner stitching is provided on an internal side of the trim assembly to interconnect with and provide support to the ornamental stitching.

According to another embodiment, a seat assembly is provided with a frame, and a trim assembly oriented about the frame to conceal the frame. The trim assembly is provided with a first trim panel, a second trim panel, and a structurally reinforced seam along an intersection of the first trim panel and the second trim panel. Ornamental stitching is provided along an exterior length of the structurally reinforced seam and incrementally traverses the structurally reinforced seam to interconnect the first trim panel and the second trim panel along the structurally reinforced seam and to provide an ornamental stitching appearance to the structurally reinforced seam.

According to another embodiment, a seat trim assembly is provided with a first trim panel and a second trim panel. Piping is provided with an externally exposed longitudinal body, and a flange extending along a length of the longitudinal body. The flange has a thickness less than a cross-section of the longitudinal body. The flange extends along a structurally reinforced seam at an intersection of the first trim panel and the second trim panel. Ornamental stitching is provided along an exterior length of the structurally reinforced seam and incrementally traverses the longitudinal body and the structurally reinforced seam to interconnect the first trim panel, the second trim panel and the flange of the piping along the structurally reinforced seam and to provide an ornamental stitching appearance to the longitudinal body. Inner stitching is provided on an internal side of the seat trim assembly to interconnect with and provide support to the ornamental stitching.

According to yet another embodiment, a seat trim assembly is provided with a first trim panel and a second trim panel. A piping with a longitudinal body extends along a structurally reinforced seam at an intersection of the first trim panel and the second trim panel so that a trim panel portion encloses the longitudinal body externally to provide an additional thickness to the structurally reinforced seam. Ornamental stitching is provided along an exterior length of the structurally reinforced seam and incrementally traversing the longitudinal body and the structurally reinforced seam to interconnect the first trim panel and the second trim panel along the structurally reinforced seam, and to provide an ornamental stitching appearance to the longitudinal body. Inner stitching is provided on an internal side of the seat trim assembly to interconnect with and provide support to the ornamental stitching.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
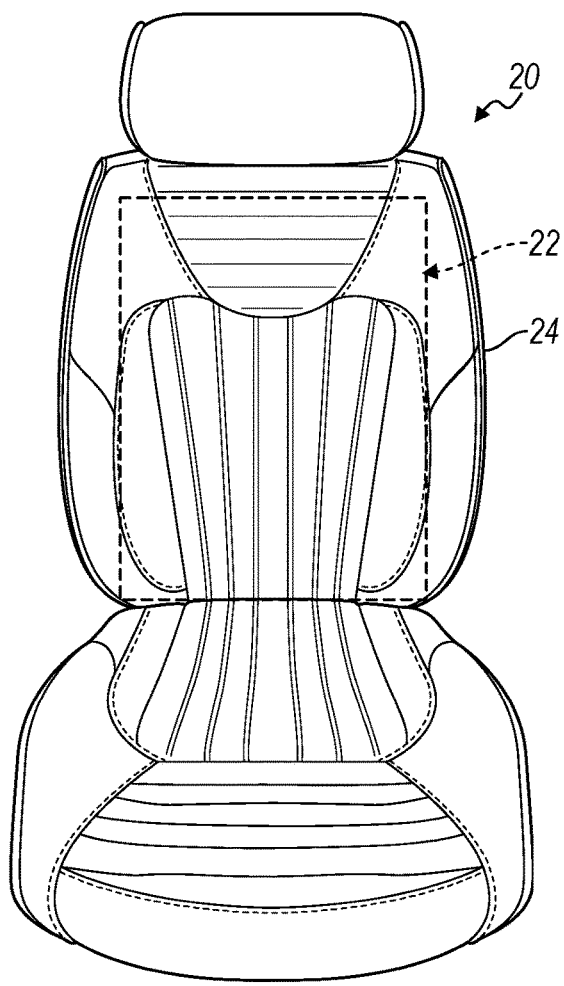
FIG. 1 is a front perspective view of a seat assembly according to an embodiment.

FIG. 1 illustrates a seat assembly 20 according to an embodiment. The depicted seat assembly 20 is for an automotive vehicle. However, any upholstered seat assembly is contemplated, such as aircraft seating, watercraft seating, office furniture, and the like. The seat assembly 20 includes a frame 22. The seat assembly 20 also includes a trim assembly 24 for enclosing and concealing the seat frame 22, underlying foam and cushioning (not shown) and internal hardware (not shown).

The trim assembly 24 includes structurally reinforced seams. The structurally reinforced seams may include piping sewn into the seam as is known in the art. Piping is also referred to as a welt. In conventional structurally reinforced seams, a simple deck seam or a double deck seam may be employed to stitch the structurally reinforced seam together.

Figure 2:
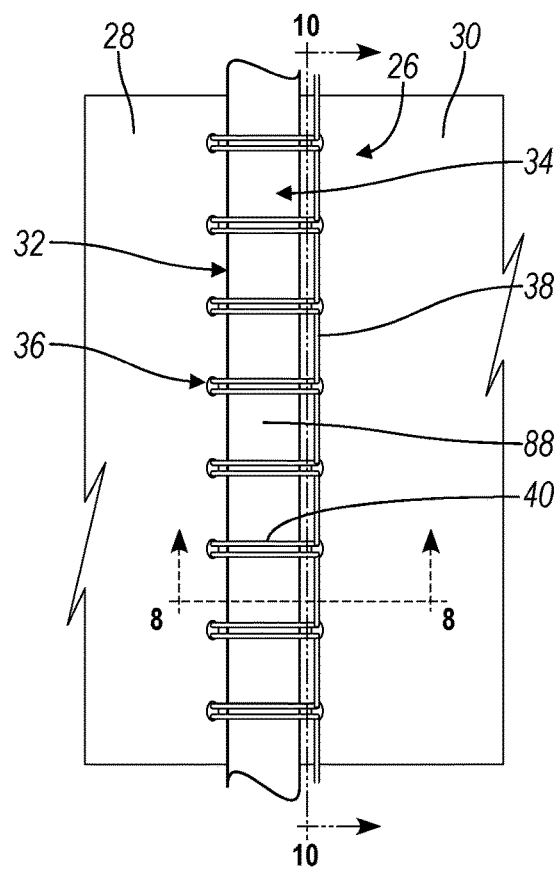
FIG. 2 is an enlarged front elevation view of a portion of a trim assembly of the seat assembly of FIG. 1 according to an embodiment.

FIG. 2 illustrates a trim assembly 26 according to an embodiment and is viewed externally, or from a contact surface or Class A surface that is viewable by the occupant. The trim assembly 26 includes a pair of trim panels 28, 30 joined at a structurally reinforced seam 32 that extends along an intersection of the first trim panel 28 and the second trim panel 30. The trim panels 28, 30 may be formed from fabric, leather, vinyl, any suitable seating material, or the like. The structurally reinforced seam 32 in the depicted embodiment employs piping 34 sewn into the seam 32.

Ornamental stitching 36 is also provided, which in this embodiment, is parallel loop stitching, with longitudinal stitches 38 extending alongside the piping 34. The stitching 36 also includes intermittent pairs of parallel loop stitches 40 that transverse the piping 34 generally perpendicular to the longitudinal stitches 38, and consequently looping the piping 34 in parallel to other sequential parallel loop stitches 40. The ornamental stitching 36 interconnects the first trim panel 28, the second trim panel 30, and the piping 34 along the structurally reinforced seam 32 and loops over the piping 34 to provide an ornamental stitching appearance to the structurally reinforced seam 32. The ornamental stitching 36 may have a different color than the piping 34 to offer variations in style and color.

Figure 3:
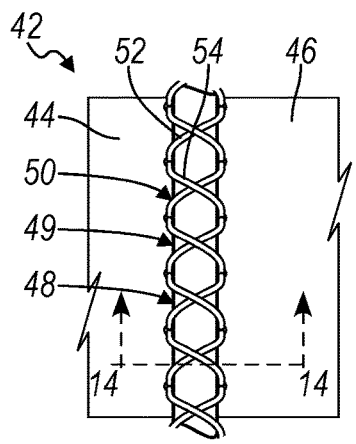
FIG. 3 is an enlarged front elevation view of a portion of a trim assembly of the seat assembly of FIG. 1 according to another embodiment.

FIG. 3 illustrates a trim assembly 42 according to another embodiment. The trim assembly 42 includes a pair of trim panels 44, 46 joined at a structurally reinforced seam 48 that extends along an intersection of the first trim panel 44 and the second trim panel 46. The structurally reinforced seam 48 in the depicted embodiment employs a piping 49 sewn into the seam 48.

Ornamental stitching 50 is also provided, which in this embodiment, is intersecting angled loop stitching, with a pair of diagonal stitches 52, 54, which intermittently loop over the seam 48 and the piping 49 diagonally to intersect over the seam 48 and the piping 49, and to cross, while angularly and intermittently extending the length of the seam 48 and the piping 49. The ornamental stitching 50 interconnects the first trim panel 44 and the second trim panel 46 along the structurally reinforced seam 48 and loops over the seam 48 and the piping 49 to provide an ornamental stitching appearance to the structurally reinforced seam 48.

Figure 4:
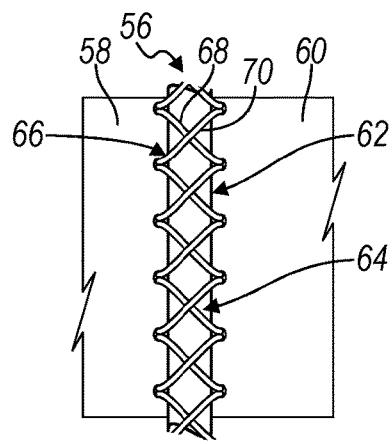
FIG. 4 is an enlarged front elevation view of a portion of a trim assembly of the seat assembly of FIG. 1 according to another embodiment.

FIG. 4 illustrates a trim assembly 56 according to another embodiment. The trim assembly 56 includes a pair of trim panels 58, 60 joined at a structurally reinforced seam 62 that extends along an intersection of the first trim panel 58 and the second trim panel 60. The structurally reinforced seam 62 in the depicted embodiment employs piping 64 sewn into the seam 62.

Ornamental stitching 66 is also provided, which in this embodiment, is intersecting angled loop stitching, with a pair of diagonal stitches 68, 70, which intermittently loop over the seam 62 and the piping 64 diagonally to intersect over the seam 62 and to cross, while angularly and intermittently extending the length of the seam 62. The ornamental stitching 66 interconnects the first trim panel 58, the second trim panel 60, and the piping 64 along the structurally reinforced seam 62 and loops over the piping 64 to provide an ornamental stitching appearance to the structurally reinforced seam 62.

Figure 5:
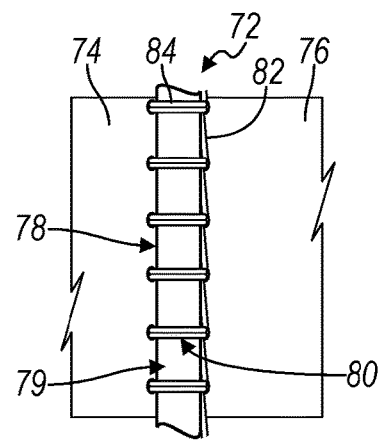
FIG. 5 is an enlarged front elevation view of a portion of a trim assembly of the seat assembly of FIG. 1 according to another embodiment.

FIG. 5 illustrates a trim assembly 72 according to another embodiment. The trim assembly 72 includes a pair of trim panels 74, 76 joined at a structurally reinforced seam 78 that extends along an intersection of the first trim panel 74 and the second trim panel 76. The structurally reinforced seam 78 in the depicted embodiment employs a piping 79 sewn into the seam 78.

Ornamental stitching 80 is also provided, which in this embodiment, is parallel loop stitching, with longitudinal stitches 82 extending alongside the seam 78 and the piping 79. The stitching 80 also includes intermittent pairs of parallel loop stitches 84 that transverse the seam 78 and the piping 79 generally perpendicular to the longitudinal stitches 82. The ornamental stitching 80 interconnects the first trim panel 74 and the second trim panel 76 along the structurally reinforced seam 78 and loops over the seam 78 and the piping 79 to provide an ornamental stitching appearance to the structurally reinforced seam 78.

Figure 6:
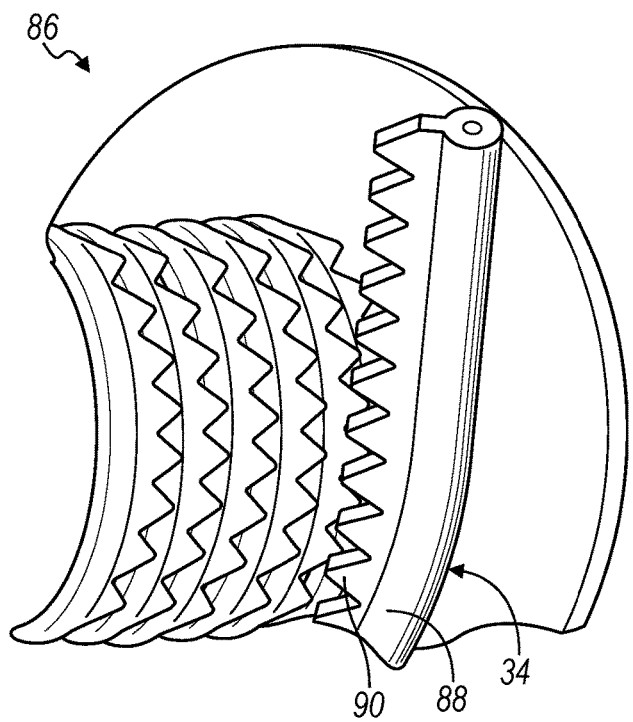
FIG. 6 is a perspective view of a roll of piping for the trim assembly of FIG. 2.
Figure 7:
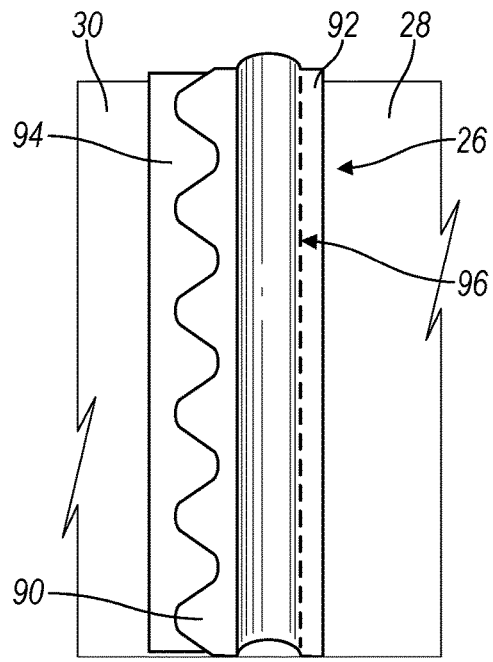
FIG. 7 is an enlarged rear elevation view of the portion of the trim assembly of FIG. 2.
Figure 8:
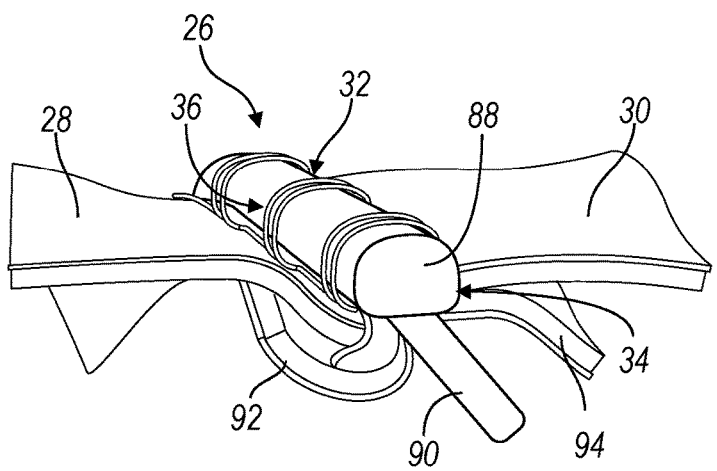
FIG. 8 is a cross-sectional perspective view of the trim assembly of FIG. 2 taken along section line 8-8 in FIG. 2.

FIG. 6 illustrates a roll 86 of the piping 34 of the trim assembly 26 of FIG. 2. FIG. 7 illustrates an internal side of the trim assembly 26; and FIG. 8 illustrates a cross-section of the trim assembly 26. The piping 34 is formed from a fabric or polymeric material, which can be stored upon the roll 86. The piping 34 includes a longitudinal body 88, which may be hollow and tubular, or solid. The body 88 may have any suitable cross-section. The body 88 of the depicted design is round and cylindrical. The body 88 is exposed externally from the trim assembly 26. A flange 90 extends from the longitudinal body 88 along the length of the body 88. The flange 90 has a thickness that is less than a cross-section of the longitudinal body 88. The flange 90 is sewn into and interconnected to the first trim panel 28 and the second trim panel 30 by the ornamental stitching 36.

With reference to FIGS. 7 and 8, each of the trim panels 28, 30 includes a fold 92, 94 along the seam 32 and within the interior of the trim assembly 26 for overlapping the trim panel 28, 30 upon itself at the seam 32. The flange 90 extends between the folds 92, 94. The trim panels 28, 30, the flange 90 and the folds 92, 94 are all stitched together by the ornamental stitching 36 and an inner stitching 96 (FIG. 7). The inner stitching 96 interconnects with the trim panels 28, 30, the flange 90, the folds 92, 94 and the ornamental stitching 36 to provide support to the structurally reinforced seam 32 and the ornamental stitching 36.

Figure 9:
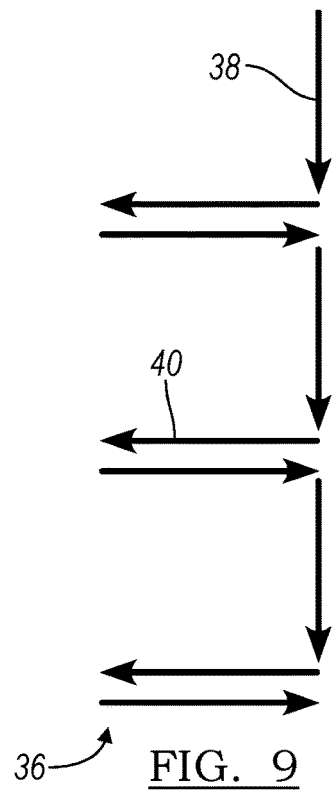
FIG. 9 is a schematic illustration of the stitching of the trim assembly of FIG. 2.

FIG. 9 illustrates a stitching schematic for the ornamental stitching 36 of the seam 32 of the trim assembly 26 of FIG. 2 as viewed from an external side of the trim assembly 26. The longitudinal stitches 38 extend longitudinally, and parallel along the piping 34. The lateral stitches 40 extend transversely across the piping 34 and then back to continue with another longitudinal stitch 38. Each stitch 38, 40 is illustrated with an arrowhead to represent a direction of stitching. Each stitch 38, 40 penetrates the trim assembly 26 at each end of the stitch 38, 40, whereby the ornamental stitching 36 engages and loops about the inner stitching 96.

A double needle version of the ornamental stitching may include a separate single line of longitudinal stitches parallel with the longitudinal stitches 38 on either side of the piping 34. The ornamental stitching 36 is employed to ornament and to attach the piping 34 to the trim panels 28, 30. Alternatively, the piping 34 may be stitched directly to the trim panels 28, 30 according to a prior art process, such as deck seam or double deck seam stitching, and the ornamental stitching 36 could be added subsequently. The ornamental stitching 36 pattern in FIG. 9 is also representative of the ornamental stitching 80 pattern for the parallel loop stitching over the piping 79 in the seam 78 of the trim assembly 72 of FIG. 5.

Figure 10:
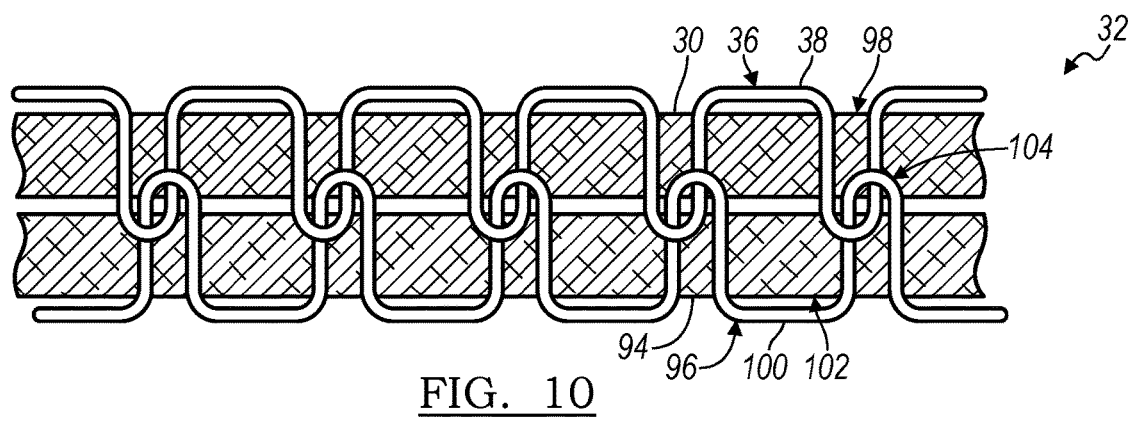
FIG. 10 is a cross section view of the portion of the trim assembly of FIG. 2 taken along section line 10-10 in FIG. 2.

FIG. 10 is a cross section of structurally reinforced seam 32 of the trim assembly 26 of FIG. 2, to illustrate the longitudinal stitches 38 without the piping 34 and the lateral stitches 40. For each stitch 38, the ornamental stitching 36 extends along an external surface 98 of the trim panel 30. The inner stitching 96 includes a corresponding longitudinal stitch 100 that extends along an inner surface 102 of the trim panel fold 94. The ornamental stitching 36 penetrates the trim component 30 and the inner stitching 96 penetrates the trim panel fold 94. Each of the stitches 38 of the ornamental stitching 36 and the stitches 100 of the inner stitching 96 intersect at a loop 104 to interconnect the ornamental stitching 36 and the inner stitching 96.

The shape of the stitches 38, 100 can change with tension of the threads of the ornamental stitching 36 and the inner stitching 96. For example, if the external thread of the ornamental stitching 36 is under additional tension, then the loop 104 would be closer to the external surface 98. Likewise, if the inner stitching 96 is under additional tension, the loop 104 would be closer to the inner surface 102. The tension of the stitching 36, 96 is maintained for evenness of the loops 104 and the stitches 38, 100.

Although longitudinal stitches 38, 100 are illustrated and described in FIG. 10, any stitches, such as the lateral stitches 40, 84 of the trim assemblies 26, 72 are looped with inner stitching for similar support. Likewise, the diagonal stitches 52, 54, 68, 70 of the trim assemblies 42, 56 are also looped with inner stitching for underlying support.

Figure 11:
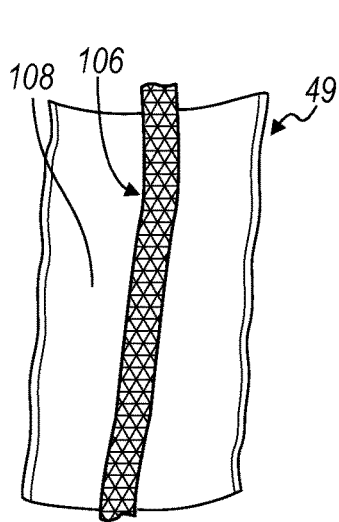
FIG. 11 is a perspective exploded view of piping according to another embodiment, for the trim assembly of FIG. 3, illustrated during assembly.
Figure 12:
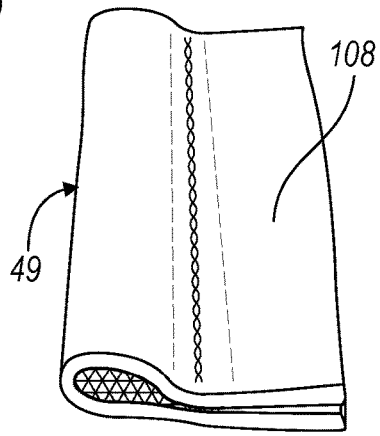
FIG. 12 is a side perspective view of the piping of the trim assembly of FIG. 3, illustrated during assembly.

FIG. 11 illustrates the piping 49 partially assembled with a piping core 106, from which the piping 49 is created with the piping core 106 with a longitudinal body so that a strip 108 of a trim panel is wrapped over the piping core 106 to create the piping 49 to structurally reinforce the seam 48 and add an additional thickness as seen in FIG. 12. The piping core 106 is utilized in the piping 49, 79 of the reinforced seams 48, 78 of the trim assemblies 42, 72 of FIGS. 3 and 5.

Figure 13:
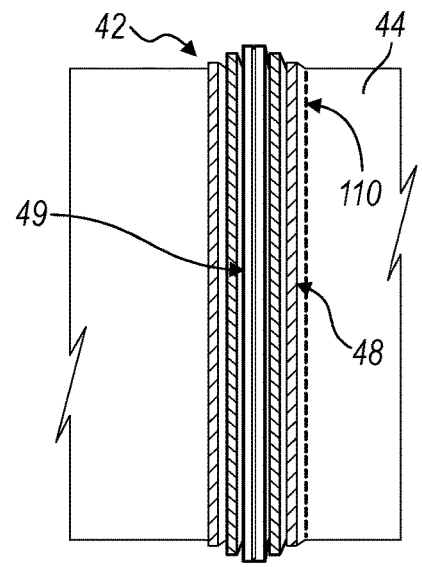
FIG. 13 is an enlarged rear elevation view of the trim assembly of FIG. 3.
Figure 14:
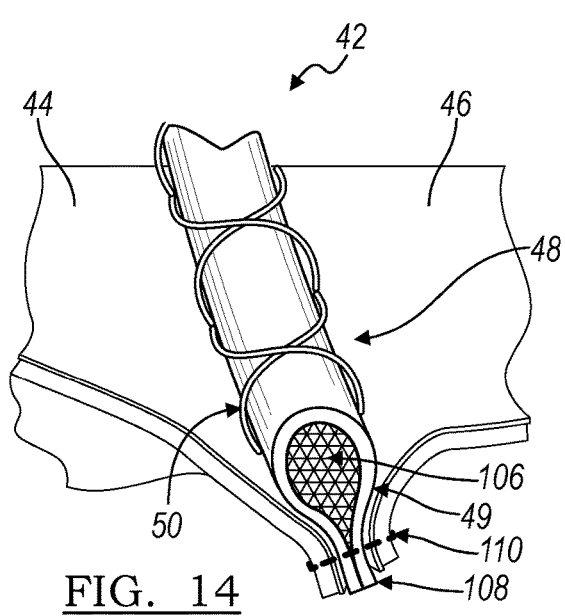
FIG. 14 is a cross-sectional perspective view of the trim assembly of FIG. 3 taken along section line 14-14 in FIG. 3.

FIGS. 13 and 14 illustrate the rear surface and cross section of the reinforced seam 48 of the trim assembly 42 of FIG. 3. The piping core 106 is enclosed in the trim panel strip 108 to create the piping 49. Although the separate trim panel strip 108 is illustrated, that is, integrated into the seam 48, the trim panel strip 108 may be formed integrally with one of the trim panels 44, 46. Inner stitching 110 extends laterally through the ends of the trim panels 44, 46 and the piping 49 to loop with the diagonal stitches 52, 54. The diagonal stitches 52, 54 and the inner stitching sew the seam 48 together.

Figure 15:
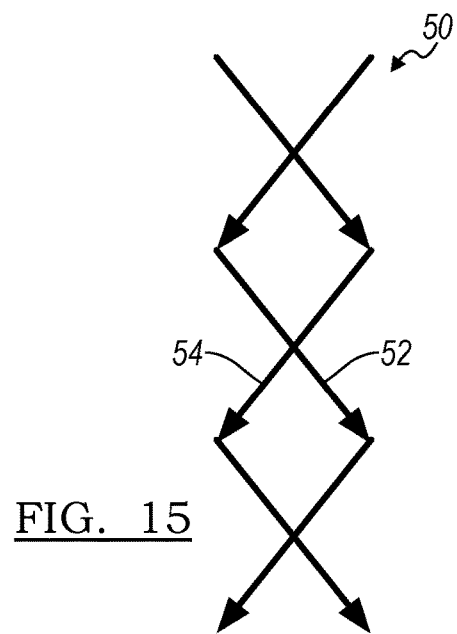
FIG. 15 is a schematic illustration of the stitching of the trim assembly of FIG. 3.

FIG. 15 illustrates the stitching pattern of the ornamental stitching 50 of the trim assembly 42 of FIG. 3. A pair of diagonal stitches 52, 54 each extend across the piping 49 and then through the trim panels 44, 46 to engage and loop with the inner stitching 110. This pattern is also employed by the ornamental stitching 66 over the piping 64 of the seam 62 of the trim assembly 56 of FIG. 4.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A trim assembly comprising:
   a first trim panel;
   a second trim panel;
   a structurally reinforced seam along an intersection of the first trim panel and the second trim panel, the structurally reinforced seam comprising piping sewn into the structurally reinforced seam; and
   ornamental stitching provided along an exterior length of the structurally reinforced seam and incrementally traversing the structurally reinforced seam to interconnect the first trim panel and the second trim panel along the structurally reinforced seam and to provide an ornamental stitching appearance to the structurally reinforced seam;

wherein the piping is sewn into the structurally reinforced seam at an internal side of the trim assembly;

wherein the piping comprises a longitudinal body;

wherein the ornamental stitching extends through the first trim panel and the second trim panel so that at least a trim panel portion encloses and conceals the longitudinal body externally; and inner stitching provided on an internal side of the trim assembly to interconnect with, and stitch to, the ornamental stitching to provide support to the ornamental stitching.

2. The trim assembly of claim 1 wherein the piping further comprises a flange extending along a length of the longitudinal body, the flange having a thickness less than a cross-section of the longitudinal body, wherein the flange is interconnected and stitched to the first trim panel and the second trim panel by the ornamental stitching.

3. The trim assembly of claim 2 wherein the ornamental stitching extends through the first trim panel, the second trim panel and the flange.

4. The trim assembly of claim 1 wherein the ornamental stitching has a different color than the piping.

5. The trim assembly of claim 1 further comprising a piping core concealed within the longitudinal body of the piping.

6. The trim assembly of claim 1 wherein the ornamental stitching extends through the first trim panel and the second trim panel so that the piping provides an additional thickness to the structurally reinforced seam.

7. The trim assembly of claim 1 wherein the ornamental stitching comprises a pair of external threads that alternatingly cross the structurally reinforced seam and each other.

8. The trim assembly of claim 7 wherein the pair of external threads are arranged diagonally along the length of the structurally reinforced seam.

9. The trim assembly of claim 1 wherein the ornamental stitching comprises one external thread that incrementally extends along the length of the structurally reinforced seam and traverses the structurally reinforced seam.

10. The trim assembly of claim 9 wherein the ornamental stitching traverses the structurally reinforced seam perpendicular to a lengthwise direction of the structurally reinforced seam.

11. A seat assembly comprising:
a frame; and
a trim assembly according to claim 1 oriented about the frame to conceal the frame.

12. A seat trim assembly comprising:
a first trim panel;
a second trim panel;
piping with an externally exposed longitudinal body, and a flange extending along a length of the longitudinal body, the flange having a thickness less than a cross-section of the longitudinal body, the flange extending along a structurally reinforced seam at an intersection of the first trim panel and the second trim panel;
ornamental stitching provided along an exterior length of the structurally reinforced seam and incrementally traversing the longitudinal body and the structurally reinforced seam to interconnect the first trim panel, the second trim panel and the flange of the piping, and to provide an ornamental stitching appearance to the longitudinal body; and
inner stitching provided on an internal side of the seat trim assembly to interconnect with, and stitch to, the ornamental stitching to provide support to the ornamental stitching; and
wherein the flange is sewn into the structurally reinforced seam at an internal side of the seat trim assembly.

13. A seat trim assembly comprising:
a first trim panel;
a second trim panel;
a piping with a longitudinal body extending along a structurally reinforced seam at an intersection of the first trim panel and the second trim panel so that a trim panel portion encloses the longitudinal body externally to provide an additional thickness to the structurally reinforced seam;
ornamental stitching provided along an exterior length of the structurally reinforced seam and incrementally traversing the longitudinal body and the structurally reinforced seam to interconnect the first trim panel and the second trim panel, and to provide an ornamental stitching appearance to the longitudinal body; and
inner stitching provided on an internal side of the seat trim assembly to interconnect with, and stitch to, the ornamental stitching to provide support to the ornamental stitching; and
wherein the piping is sewn into the structurally reinforced seam at an internal side of the seat trim assembly.

* * * * *